US009296855B2

(12) United States Patent
Strobel et al.

(10) Patent No.: US 9,296,855 B2
(45) Date of Patent: *Mar. 29, 2016

(54) HIGH-LATENCY HARDENERS FOR EPOXY RESINS

(75) Inventors: Sylvia Strobel, Garching (DE); Martin Ebner, Kissing (DE); Hans-Peter Krimmer, Kirchweidach (DE); Monika Brandl, Tacherting (DE)

(73) Assignee: ALZCHEM AG, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/000,992

(22) PCT Filed: Feb. 23, 2012

(86) PCT No.: PCT/EP2012/053091
§ 371 (c)(1),
(2), (4) Date: Sep. 10, 2013

(87) PCT Pub. No.: WO2012/113878
PCT Pub. Date: Aug. 30, 2012

(65) Prior Publication Data
US 2014/0024741 A1    Jan. 23, 2014

(30) Foreign Application Priority Data

Feb. 23, 2011  (DE) .......................... 10 2011 012 079
Jan. 17, 2012  (DE) .......................... 10 2012 000 674

(51) Int. Cl.
| C08G 59/44 | (2006.01) |
| C08G 59/46 | (2006.01) |
| C08G 59/40 | (2006.01) |
| C08G 59/02 | (2006.01) |
| C08G 18/00 | (2006.01) |
| C08G 18/06 | (2006.01) |
| C08L 63/00 | (2006.01) |
| C08L 75/04 | (2006.01) |
| C08J 5/04 | (2006.01) |

(52) U.S. Cl.
CPC ............ *C08G 18/06* (2013.01); *C08G 59/4021* (2013.01); *C08G 59/46* (2013.01); *C08L 63/00* (2013.01)

(58) Field of Classification Search
None
See application file for complete search history.

(56) References Cited

U.S. PATENT DOCUMENTS

| 3,624,178 | A | * | 11/1971 | Lohse et al. ................... 528/369 |
| 4,126,664 | A | * | 11/1978 | Weiss .............................. 423/265 |
| 4,670,533 | A |   | 6/1987 | Lauterbach |
| 4,677,170 | A | * | 6/1987 | Monnier et al. ............... 525/539 |
| 4,912,190 | A |   | 3/1990 | Schafer et al. |
| 5,407,977 | A |   | 4/1995 | Everett et al. |
| 5,424,373 | A |   | 6/1995 | Flury et al. |
| 5,429,831 | A |   | 7/1995 | Williams et al. |
| 5,512,372 | A |   | 4/1996 | Blanc et al. |
| 6,410,127 | B1 | * | 6/2002 | Kamae et al. ............... 428/297.4 |
| 2004/0147711 | A1 |   | 7/2004 | Christiansen et al. |
| 2006/0106168 | A1 |   | 5/2006 | Ota et al. |
| 2007/0027274 | A1 |   | 2/2007 | Antelmann et al. |
| 2008/0081170 | A1 | * | 4/2008 | Tilbrook et al. ............. 428/292.1 |
| 2012/0208925 | A1 |   | 8/2012 | Hitzler et al. |
| 2013/0079488 | A1 |   | 3/2013 | Hitzler et al. |
| 2013/0323429 | A1 |   | 12/2013 | Strobel et al. |
| 2015/0158970 | A1 |   | 6/2015 | Strobel et al. |
| 2015/0158972 | A1 |   | 6/2015 | Strobel et al. |

FOREIGN PATENT DOCUMENTS

| AT | 351772 | | 8/1979 | |
| AU | 705375 | | 5/1999 | |
| CA | 2145590 | | 9/1995 | |
| CN | 1513893 A | | 7/2004 | |
| CN | 1717427 A | | 1/2006 | |
| CN | 1798787 A | | 7/2006 | |
| CN | 101240154 A | | 8/2008 | |
| DE | 2459752 | * | 7/1976 | ............ C08G 59/40 |
| DE | 2743015 | | 4/1979 | |
| DE | 3540524 | | 5/1987 | |
| DE | 4026363 | | 3/1992 | |
| DE | 69613479 | | 4/2002 | |
| DE | 69331759 | | 1/2003 | |
| DE | 102006012550 A1 | | 9/2007 | |
| DE | 102009052061 | | 5/2011 | |
| DE | 102010020882 | | 11/2011 | |
| DE | 102011012079 | | 8/2012 | |
| EP | 0108712 | | 5/1984 | |
| EP | 0196077 | | 10/1986 | |
| EP | 0 204 658 | | 12/1986 | |
| EP | 0429395 | | 5/1991 | |
| EP | 0639599 | | 2/1995 | |
| EP | 0658584 | | 6/1995 | |
| EP | 0675143 | | 1/2002 | |
| EP | 1996641 | | 10/2009 | |

(Continued)

OTHER PUBLICATIONS

Machine translation of DE 2459752.*
Scifinder cyanamide properties (2014).*
Machine translation of DE 102006012550 A1.*
International Search Report dated Jun. 8, 2012 for International Application No. PCT/EP2012/053092.
Non-Final Office Action dated Jan. 23, 2015, in related U.S. Appl. No. 13/983,935, 26 pages.
German Patent Application No. DE102012015315.5, Search Report dated Apr. 4, 2013.
German Patent Application No. DE102012015318.3, Search Report dated Apr. 4, 2013.
"Scifinder Cyanamide Properties," American Chemical Society, 2014, 3 pages.
International Patent Application No. PCT/EP2013/066078, International Search Report mailed Mar. 27, 2014, 7 pages.
International Patent Application No. PCT/EP2013/066102, International Search Report mailed Mar. 31, 2014, 7 pages.
Non-Final Office Action mailed Jan. 23, 2015 in U.S. Appl. No. 13/983,935, 26 pages.
Final Office Action dated Jul. 7, 2015, in related U.S. Appl. No. 13/983,935, 53 pages.

(Continued)

*Primary Examiner* — Mark Kaucher
*Assistant Examiner* — Kregg Brooks
(74) *Attorney, Agent, or Firm* — Kilpatrick Townsend & Stockton LLP

(57) ABSTRACT

The present invention relates to novel high-latency liquid hardeners for hardening of curable polymer resins, especially epoxy resins, and to epoxy resin compositions comprising liquid hardeners for the production of fiber composite materials.

13 Claims, No Drawings

(56) References Cited

FOREIGN PATENT DOCUMENTS

| | | |
|---|---|---|
| GB | 2247237 | 2/1992 |
| JP | 60069126 A | 4/1985 |
| WO | 2004050739 A1 | 6/2004 |
| WO | 2004106402 A2 | 12/2004 |
| WO | 2007062853 | 6/2007 |
| WO | 2007107288 | 9/2007 |
| WO | 2011054945 | 5/2011 |
| WO | 2011134168 | 11/2011 |
| WO | 2011144659 | 11/2011 |
| WO | 2012113878 | 8/2012 |

OTHER PUBLICATIONS

Huang, et al., "Studies on the Characterization of Ureas as Latent Accelerators for Dicyandiamide-Cured Epoxy Resin", Acta Polymerica Sinica, No. 3, Jun. 1989, pp. 329-336.

PCT/EP2013/066078, English Translation of International Preliminary Report on Patentability dated Feb. 12, 2015.

PCT/EP2013/066102, English translation of International Preliminary Report on Patentability dated Feb. 2, 2015.

Non-Final Office Action in related U.S. Appl. No. 13/983,935, Nov. 12, 2015, 67 pages.

Office Action in related Japanese Application No. 2013-554899, Aug. 19, 2015, 2 pages.

U.S. Appl. No. 14/407,232, "Non-Final Office Action", Dec. 4, 2015, 43 pages.

U.S. Appl. No. 14/418,227, "Non-Final Office Action", Dec. 7, 2015, 23 pages.

U.S. Appl. No. 14/955,828, "Non-Final Office Action", Jan. 15, 2016, 41 pages.

* cited by examiner

HIGH-LATENCY HARDENERS FOR EPOXY RESINS

PRIOR RELATED APPLICATIONS

This application is a National Phase application of International Application No. PCT/EP2012/053091 filed Feb. 23, 2012, which claims priority to German Patent Application No. 10 2011 012 079.3 filed Feb. 23, 2011, and German Patent Application No. 10 2012 000 674.8 filed Jan. 17, 2012, each of which is incorporated herein by reference in its entirety.

The present invention relates to novel high-latency liquid hardeners for hardening curable polymer resins, in particular epoxy resins, and to epoxy resin compositions including these high-latency hardeners for the production of fibre composite materials.

The use of thermoplastic epoxy resins is widespread because of their good resistance to chemicals, their very good thermal and dynamic mechanical properties and their high capacity for electrical insulation. Moreover, epoxy resins display good adhesion to many substrates and so are extremely well suited to use in fibre composite materials (composites). For use in fibre composite materials, both good wetting of the fibre—that is to say low viscosity in the resin formulation selected for preparing the composite—and good mechanical properties after curing is complete are desirable.

Various methods are used to prepare mouldings from fibre composite materials, such as the prepreg method and various infusion or injection methods, including in particular RTM (resin transfer moulding). Of these methods, the infusion or injection methods have in particular gained in importance over the last few years. For example, in the infusion methods, dry reinforcement materials such as fibre mats, nonwovens or woven or knitted fabrics that are in an open mould are covered with a leak-tight vacuum film and, after application of the vacuum, are impregnated with resin formulations by way of distribution lines. These methods have the advantage that large elements with complex geometries can be moulded in a short time.

The epoxy resin formulation for an infusion or injection method must have a low viscosity in order to enable the fibre materials to be impregnated under vacuum within an appropriate time. If resin formulations with excessive viscosities are used, or if resin formulations which generate excessive viscosities too quickly during the injection period are used, there will be parts which are not impregnated and other voids in the resulting composite.

The mechanisms by which epoxy resins are cured vary. As well as curing with phenols or anhydrides, curing is frequently performed using amines. These substances are usually liquid and can be blended with epoxy resins very well. Because of the high reactivity and hence very low latency, epoxy resin compositions of this kind take a two-component form. This means that the resin (A component) and the hardener or curing agent (B component) are stored separately and are mixed in the correct ratio only shortly before use. In this context, "latent" means that a mixture of the individual components is stable under defined storage conditions. These two-component resin formulations are also termed so-called cold-curing resin formulations, and the hardeners used for this are usually selected from the group comprising amines or amidoamines.

By contrast, one-component hot-curing epoxy resin formulations are pre-packed ready to use—that is to say the epoxy resin and the hardener are mixed at the factory. This therefore rules out the possibility of mixing errors in the individual components when they are used on site. There is a precondition here for latent curing systems, which do not react with the epoxy resin at room temperature (are capable of being stored) but readily undergo full reaction when heated, depending on the energy input. For one-component epoxy resin formulations of this kind, dicyandiamide is for example a particularly suitable and indeed low-cost hardener. In ambient conditions, corresponding mixtures of the resin and hardener can be stored in usable form for up to twelve (12) months.

Unfortunately, these epoxy resin mixtures including high-latency dicyandiamide or other high-latency hardeners have the disadvantage that the hardeners are not very soluble in epoxy resins and, in the infusion or injection method for preparing fibre composite materials, are retained and filtered out by the fibre mats at the inlet points for the resin. Thus, homogeneous mixing of the hardener in the resins in the composite before use is prevented. This prevents the entire composite from curing completely.

The object of the present invention is therefore to provide novel substances, mixtures or hardeners for curing curable polymer resins, in particular epoxy resins and epoxy resin compositions, which can be used to prepare composites and fibre-reinforced matrices. Here, there is furthermore a need for hardeners of this kind to combine the advantages of known amine hardeners and known dicyandiamide powder hardeners without incorporating their disadvantages, such as low latency or filtration of the particles. These novel hardeners are to have high latency and hence a high stability under storage below the curing temperature and high reactivity at the curing temperature, are to enable complete curing of the epoxy resin, are to be soluble or completely miscible in epoxy resins, and are to be suitable for use in infusion, injection or RTM methods.

These objects are achieved by liquid hardeners or curing agents according to claim 1 and polymer resin compositions according to claims 8 and 9. Thus, the present invention relates according to a first embodiment to a liquid hardener for curing or hardening polymer resins, in particular curable polymer resins, which includes a) cyanamide, b) at least one urea derivative of the formula (I) or formula (II), and c) at least one stabiliser selected from the group comprising inorganic or organic acids, wherein the urea derivatives have the following structure:

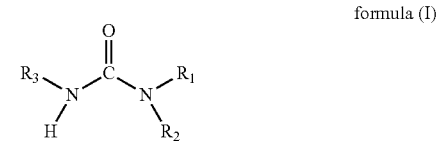

formula (I)

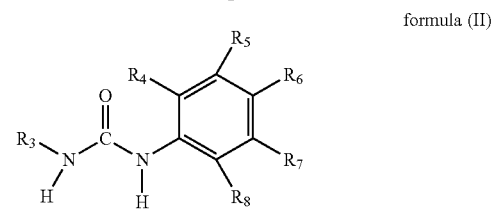

formula (II)

wherein the following applies to the radicals, in each case simultaneously or independently of one another:

$R^1$, $R^2$=simultaneously or independently of one another hydrogen, C1- to C15-alkyl, C3- to C15-cycloalkyl or together form a ring of C3- to 010-alkylene;

$R^3$=hydrogen, C1- to C15-alkyl, C3- to C15-cycloalkyl, aryl, arylalkyl,
—NHC(O)NR$^1$R$^2$-substituted C1- to C15-alkyl,
—NHC(O)NR$^1$R$^2$-substituted C3- to C15-cycloalkyl,
—NHC(O)NR$^1$R$^2$-substituted aryl or
—NHC(O)NR$^1$R$^2$-substituted arylalkyl;
$R^4$, $R^5$, $R^6$, $R^7$, $R^8$=simultaneously or independently of one another hydrogen, halogen, C1- to C15-alkyl, C3- to C15-cycloalkyl, aryl, arylalkyl,
—CF$_3$, —NHC(O)NR$^1$R$^2$,
—NHC(O)NR$^1$R$^2$-substituted 01- to C15-alkyl,
—NHC(O)NR$^1$R$^2$-substituted aryl or
—NHC(O)NR$^1$R$^2$-substituted arylalkyl.

Surprisingly, it has been found that intensive blends of cyanamide and at least one urea derivative according to formula (I) or formula (II) with the denotations indicated above give liquid to semi-liquid mixtures having a low melting point (by comparison with the starting substances) which at room temperature dissolve completely in epoxy resin or are completely miscible in epoxy resin. Although separate substances are still present according to analysis, DSC analyses show the endothermic melting peaks of one-component systems. These mixtures are outstandingly well suited to hardening curable polymer resins. Their mode of action in the epoxy resin is comparable to the hardening properties of dicyandiamide accelerated using imidazoles, and is <100° C. Despite this a latency at room temperature of between several days and several weeks is retained.

Surprisingly, it has moreover been shown that liquid hardeners according to the invention consistently initiate the hardening of polymer resins at lower temperatures than powder mixtures of the same composition and so enable mouldings to be made in a shorter time. Moreover, the liquid hardeners according to the invention reduce the viscosity of the finished formulated resins, in particular epoxy resin compositions, with the result that these hardeners are outstandingly well suited to use in infusion resins, in particular since a considerable time saving in making mouldings is made possible. It should be emphasised here that the conventional disadvantages of other liquid hardeners, such as very low latency and thus very high reactivity even at room temperature, are not observed. Moreover, resins cured using the hardener according to the invention that have higher glass transition temperatures than resins cured using amine hardeners may be prepared.

Further surprisingly, it was found that a particularly high latency and hence high storage stability of the hardeners themselves and also of epoxy resin compositions including these hardeners can be established if a stabiliser from the group comprising inorganic and organic acids is added to the mixtures or hardeners. Adding stabilisers from the group comprising inorganic or organic acids allowed the latency to be doubled or in some cases even tripled. At the same time, the outstanding curing properties such as high reactivity at curing temperature by comparison with hardeners with no stabilisers are maintained.

Overall, a hardener can thus be provided which, because of its reduced viscosity and high latency in the polymer resin compositions and high reactivity in the polymer resin compositions at the curing temperature is outstandingly well suited to use in infusion or injection methods.

As a further development of the present invention, it may be provided here for the liquid hardener to include cyanamide and at least one urea derivative of the formula (I) or formula (II) or mixtures of these urea derivatives in a molar ratio of cyanamide:urea derivative or urea derivative mixture from 1:1 to 4:1.

In particular, according to the present invention it is provided for the molar ratio of cyanamide:urea derivative or urea derivative mixture to be 1:1 to 3:1, more preferably 1:1 to 2:1 and most particularly preferably 2:1 to 4:1.

In the presence of a stabiliser, the molar ratios of cyanamide:urea derivative may, however, also lie outside the preferred range of 1:1 to 4:1. For example, molar ratios of cyanamide:urea derivative of 0.1 to <1:1, in particular 0.2 to <1:1, are possible, as indeed are molar ratios of cyanamide:urea derivative of >4:1 to 20:1, in particular >4:1 to 10:1.

In this connection, the term liquid hardener according to the present invention is intended to mean a hardener having a melting point $S_m$ of $S_m$<20° C. (normal pressure) or which is liquid at a temperature of 20° C. (normal pressure) and has a viscosity of less than 1 Pa·s. The liquid mixtures or hardeners according to the invention preferably have a viscosity of 100 mPa·s, more preferably <20 mPa·s and even more preferably 12 mPa·s at 25° C. However, particularly preferred are liquid mixtures or liquid hardeners of this kind which have a melting point $S_m$ of $S_m$<10° C. (normal pressure), most particularly preferably a melting point $S_m$ of $S_m$<0° C. (normal pressure), or which at a temperature of 10° C. (normal pressure), and most particularly preferably at a temperature of 0° C. (normal pressure), are liquid and have a viscosity of less than 1 Pa·s.

It should be emphasised here that these hardeners are in liquid form as such and in particular, besides cyanamide, at least one urea derivative or mixtures thereof and a stabiliser, include no solvent or solubiliser and so are free of solvents or solubilisers. Here, in the context of the present invention the term solvent or solubiliser is intended to mean any inorganic or organic solvents or solubiliser or mixtures thereof which is/are used in chemical synthesis or in analysis when preparing a solution. In the context of the present invention, the term free of solvents or free of solubilisers is intended to mean a hardener which is substantially free of solvents or solubilisers and contains, as dictated by its preparation, an amount not exceeding 1.0% by weight of solvents or solubilisers.

In an alternative embodiment, however, it is also possible for the hardeners to contain a solvent, in particular water. Adding solvent is not required here to make the mixtures liquid but may be favourable as a result of other technical requirements.

Furthermore, in the context of the present invention the term C1- to C15-alkyl is intended to mean a linear or branched alkyl radical having a chain length of up to 15 carbon atoms which has in particular the general formula $C_nH_{2n+1}$, in which n=1 to 15. Here, it is in particular provided that C1- to C15-alkyl means methyl, ethyl, propyl, butyl, pentyl, hexyl, heptyl, octyl, nonyl or decyl, wherein these alkyl radicals may furthermore preferably also be unbranched, single-branched, multiple-branched or alkyl-substituted.

Those C1- to C15-alkyl radicals are preferred which are themselves mono- or polysubstituted with alkyl, in particular with C1- to C5-alkyl. The term C1- to C5-alkyl according to the present invention may also preferably mean methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl or 1-ethylpropyl. Hence, C1- to C15-alkyl according to the present invention may in particular also mean 1-methylethyl, 1-methylpropyl, 1-methylbutyl, 1-methylpentyl, 1-methylhexyl, 1-methylheptyl, 1-methyloctyl, 1-methylnonyl, 1-methyldecanyl, 1-ethylpropyl, 1-ethylbutyl, 1-ethylpentyl, 1-ethylhexyl, 1-ethylheptyl, 1-ethyloctyl, 1-ethylnonyl, 1-ethyldecanyl, 2-methylpropyl, 2-methylbutyl, 2-methylpentyl, 2-methylhexyl, 2-methylheptyl, 2-methyloctyl, 2-methylnonyl, 2-methyldecanyl, 2-ethylpropyl, 2-ethylbutyl, 2-ethylpentyl, 2-ethylhexyl, 2-ethylheptyl, 2-ethyloctyl, 2-ethylnonyl, 2-ethyldecanyl, 1,1-dimethylethyl, 1,1-dimethylpropyl, 1,1-dimethylbutyl, 1,1-dimethylpentyl, 1,1-dimethylhexyl, 1,1-dimethylheptyl, 1,1-dimethyloctyl, 1,1-dimethylnonyl, 1,1-dimethyldecanyl, 1,2-dimethyl propyl, 1,2-dimethylbutyl, 1,2-dimethylpentyl, 1,2-dimethylhexyl, 1,2-dimethylheptyl, 1,2-dimethyloctyl, 1,2-dimethylnonyl, 1,2-dimethyldecanyl, 2-ethyl-1-methylbutyl, 2-ethyl-1-methylpentyl, 2-ethyl-1-methylhexyl, 2-ethyl-1-methylheptyl, 2-ethyl-1-methyloctyl, 2-ethyl-1-methylnonyl, 2-ethyl-1-methyldecanyl, 1-ethyl-2-methylpropyl, 1-ethyl-2-methylbutyl, 1-ethyl-2-methylpentyl, 1-ethyl-2-methylhexyl, 1-ethyl-2-methylheptyl, 1-ethyl-2-methyloctyl, 1-ethyl-2-methylnonyl or 1-ethyl-2-methyldecanyl.

Furthermore preferably, a C1- to C15-alkyl radical, in particular methyl, ethyl, propyl, butyl, may itself also be substituted with a C3- to C15-cycloalkyl radical, where C3- to C15-cycloalkyl has the meaning given below. Thus, C1- to C15-alkyl may in particular also have the meaning of C3- to C15-cycloalkyl-methyl, 1-(C3- to C15-cycloalkyl)-1-ethyl, 2-(C3- to C15-cycloalkyl)-1-ethyl, 1-(C3- to C15-cycloalkyl)-1-propyl, 2-(C3- to C15-cycloalkyl)-1-propyl or 3-(C3- to C15-cycloalkyl)-1-propyl, where C3- to C15-cycloalkyl has the meaning given below.

In the context of the present invention, the term C3- to C15-cycloalkyl is intended to mean a monocyclic or bicyclic cycloalkyl radical having 3 to 15 carbon atoms, in particular a cycloalkyl radical of the general formula $C_nH_{2n-1}$ where n=3 to 15. Furthermore preferably, the term C3- to C15-cycloalkyl may mean cyclopropyl, cyclobutyl, cyclopentyl, cyclohexyl or cycloheptyl, where these cycloalkyl radicals may themselves furthermore be mono- or polysubstituted with C1- to C5-alkyl radicals having the meaning given above. Thus, furthermore preferably, C3- to C15-cycloalkyl may also be 1-methyl-1-cyclopropyl, 1-methyl-1-cyclobutyl, 1-methyl-1-cyclopentyl, 1-methyl-1-cyclohexyl, 1-methyl-1-cycloheptyl, 2-methyl-1-cyclopropyl, 2-methyl-1-cyclobutyl, 2-methyl-1-cyclopentyl, 2-methyl-1-cyclohexyl, 2-methyl-1-cycloheptyl, 3-methyl-1-cyclobutyl, 3-methyl-1-cyclopentyl, 3-methyl-1-cyclohexyl, 3-methyl-1-cycloheptyl, 4-methyl-1-cyclohexyl, 4-methyl-1-cycloheptyl, 1,2-dimethyl-1-cyclopropyl, 2,2-dimethyl-1-cyclopropyl, 2,3-dimethyl-1-cyclopropyl, 1,2-dimethyl-1-cyclobutyl, 1,3-dimethyl-1-cyclobutyl, 2,2-dimethyl-1-cyclobutyl, 2,3-dimethyl-1-cyclobutyl, 2,4-dimethyl-1-cyclobutyl, 3,3-dimethyl-1-cyclobutyl, 1,2-dimethyl-1-cyclopentyl, 1,3-dimethyl-1-cyclopentyl, 2,2-dimethyl-1-cyclopentyl, 2,3-dimethyl-1-cyclopentyl, 2,4-dimethyl-1-cyclopentyl, 2,5-dimethyl-1-cyclopentyl, 3,3-dimethyl-1-cyclopentyl, 3,4-dimethyl-1-cyclopentyl, 1,2-dimethyl-1-cyclohexyl, 1,3-dimethyl-1-cyclohexyl, 1,4-dimethyl-1-cyclohexyl, 1,5-dimethyl-1-cyclohexyl, 1,6-dimethyl-1-cyclohexyl, 2,2-dimethyl-1-cyclohexyl, 2,3-dimethyl-1-cyclohexyl, 2,4-dimethyl-1-cyclohexyl, 2,5-dimethyl-1-cyclohexyl, 2,6-dimethyl-1-cyclohexyl, 3,3-dimethyl-1-cyclohexyl, 3,4-dimethyl-1-cyclohexyl, 3,5-dimethyl-1-cyclohexyl, 3,6-dimethyl-1-cyclohexyl, 4,4-dimethyl-1-cyclohexyl, 1,2,2-trimethyl-1-cyclopropyl, 1,2,3-trimethyl-1-cyclopropyl, 1,2,2-trimethyl-1-cyclobutyl, 1,3,3-trimethyl-1-cyclobutyl, 1,2,3-trimethyl-1-cyclobutyl, 2,2,3-trimethyl-1-cyclobutyl, 2,2,4-trimethyl-1-cyclobutyl, 1,2,2-trimethyl-1-cyclopentyl, 1,2,3-trimethyl-1-cyclopentyl, 1,2,4-trimethyl-1-cyclopentyl, 1,2,5-trimethyl-1-cyclopentyl, 1,3,3-trimethyl-1-cyclopentyl, 1,3,4-trimethyl-1-cyclopentyl, 1,3,5-trimethyl-1-cyclopentyl, 2,2,3-trimethyl-1-cyclopentyl, 2,2,4-trimethyl-1-cyclopentyl, 2,2,5-trimethyl-1-cyclopentyl, 2,3,3-trimethyl-1-cyclopentyl, 2,3,4-trimethyl-1-cyclopentyl, 2,3,5-trimethyl-1-cyclopentyl, 2,3,3-trimethyl-1-cyclopentyl, 2,4,4-trimethyl-1-cyclopentyl, 2,4,5-trimethyl-1-cyclopentyl, 2,5,5-trimethyl-1-cyclopentyl, 3,3,4-trimethyl-1-cyclopentyl, 3,3,5-trimethyl-1-cyclopentyl, 3,4,5-trimethyl-1-cyclopentyl, 3,4,4-trimethyl-1-cyclopentyl, 1,2,2-trimethyl-1-cyclohexyl, 1,2,3-trimethyl-1-cyclohexyl, 1,2,4-trimethyl-1-cyclohexyl, 1,2,5-trimethyl-1-cyclohexyl, 1,2,6-trimethyl-1-cyclohexyl, 1,3,3-trimethyl-1-cyclohexyl, 1,3,4-trimethyl-1-cyclohexyl, 1,3,5-trimethyl-1-cyclohexyl, 1,3,6-trimethyl-1-cyclohexyl, 1,4,4-trimethyl-1-cyclohexyl, 2,2,3-trimethyl-1-cyclohexyl, 2,2,4-trimethyl-1-cyclohexyl, 2,2,5-trimethyl-1-cyclohexyl, 2,2,6-trimethyl-1-cyclohexyl, 2,3,3-trimethyl-1-cyclohexyl, 2,3,4-trimethyl-1-cyclohexyl, 2,3,5-trimethyl-1-cyclohexyl, 2,3,6-trimethyl-1-cyclohexyl, 2,4,4-trimethyl-1-cyclohexyl, 2,4,5-trimethyl-1-cyclohexyl, 2,4,6-trimethyl-1-cyclohexyl, 2,5,5-trimethyl-1-cyclohexyl, 2,5,6-trimethyl-1-cyclohexyl, 2,6,6-trimethyl-1-cyclohexyl, 3,3,4-trimethyl-1-cyclohexyl, 3,3,5-trimethyl-1-cyclohexyl, 3,3,6-trimethyl-1-cyclohexyl, 3,4,4-trimethyl-1-cyclohexyl, 3,4,5-trimethyl-1-cyclohexyl, 3,4,6-trimethyl-1-cyclohexyl, 3,5,6-trimethyl-1-cyclohexyl, 1,2,3,3-tetramethyl-1-cyclopropyl, 2,2,3,3-tetramethyl-1-cyclopropyl, 1,2,2,3-tetramethyl-1-cyclopropyl, 1,2,2,3-tetramethyl-1-cyclobutyl, 1,2,3,3-tetramethyl-1-cyclobutyl, 2,2,3,3-tetramethyl-1-cyclobutyl, 2,3,3,4-tetramethyl-1-cyclobutyl, 1,2,2,3-tetramethyl-1-cyclopentyl, 1,2,2,4-tetramethyl-1-cyclopentyl, 1,2,2,5-tetramethyl-1-cyclopentyl, 1,2,3,3-tetramethyl-1-cyclopentyl, 1,2,3,4-tetramethyl-1-cyclopentyl, 1,2,3,5-tetramethyl-1-cyclopentyl, 1,2,5,5-tetramethyl-1-cyclopentyl, 2,2,3,3-tetramethyl-1-cyclopentyl, 2,2,3,3-tetramethyl-1-cyclohexyl, 2,2,4,4-tetramethyl-1-cyclohexyl, 2,2,5,5-tetramethyl-1-cyclohexyl, 3,3,4,4-tetramethyl-1-cyclohexyl, 3,3,5,5-tetramethyl-1-cyclohexyl, 1-ethyl-1-cyclopropyl, 1-ethyl-1-cyclobutyl, 1-ethyl-1-cyclopentyl, 1-ethyl-1-cyclohexyl, 1-ethyl-1-cycloheptyl, 2-ethyl-1-cyclopropyl, 2-ethyl-1-cyclobutyl, 2-ethyl-1-cyclopentyl, 2-ethyl-1-cyclohexyl, 2-ethyl-1-cycloheptyl, 3-ethyl-1-cyclobutyl, 3-ethyl-1-cyclopentyl, 3-ethyl-1-cyclohexyl, 3-ethyl-1-cycloheptyl, 4-ethyl-1-cyclohexyl or 4-ethyl-1-cycloheptyl.

According to the present invention, $R^1$ and $R^2$ may also together be C3- to C10-alkylene, where $R^1$ and $R^2$ together with the nitrogen of the urea derivative form a nitrogen-containing ring. In particular, it may be provided here for $R^1$ and $R^2$ together to be ethylene, propylene, butylene, pentylene or hexylene, where these alkylene radicals may themselves be mono- or polysubstituted as appropriate with alkyl radicals. Here, $R^1$ and $R^2$ form, together with the nitrogen of the urea derivative, an aziridine, azetidine, azolidine, azinane or azepane which may itself be mono- or polysubstituted as appropriate with C1- to C5-alkyl radicals having the meaning given above.

According to the present invention, —NHC(O)NR$^1$R$^2$ is a 1-ureayl radical which is substituted at the nitrogen N3 with the radicals $R^1$ and $R^2$, where $R^1$ and $R^2$ have the meanings given above, and which is bound to a skeletal structure at the nitrogen N1.

According to the present invention, halogen is in particular fluorine, chlorine or bromine.

According to the present invention, aryl is in particular an aromatic aryl radical having 3 to 20 carbon atoms and which may preferably itself be (mono- or poly-) substituted with a C1- to C5-alkyl radical having the meaning given above. Particularly preferably, it may be provided that there is used as the aryl radical a benzene radical, naphthalene radical, anthracene radical or perylene radical which may itself be mono- or polysubstituted with a C1- to C5-alkyl radical having the meaning given above. Thus, aryl is in particular toluyl, xylenyl, pseudocumolyl or mesitylenyl.

According to the present invention, arylalkyl is a C1- to C15-alkyl radical having the meaning given above which is substituted with an aryl radical of the meaning given above. In particular, arylalkyl may be a benzyl radical.

Particularly preferably, liquid hardeners or mixtures according to the invention include at least one aliphatic urea derivative according to formula (I). In these aliphatic urea derivatives according to formula (I), $R^1$ and $R^2$ have the meaning given above and $R^3$ is hydrogen, C1- to C15-alkyl, C3- to C15-cycloalkyl, —NHC(O)NR$^1$R$^2$-substituted C1- to C15-alkyl or —NHC(O)NR$^1$R$^2$-substituted C1- to C15-cycloalkyl.

Particularly preferably, the liquid hardeners or liquid mixtures according to the invention include at least one urea derivative of the formula (I) in which at least one of the radicals $R^1$ and $R^2$ represent a methyl radical. Particularly preferred is methylurea or N,N-dimethylurea (that is to say that $R^1=R^2$=methyl and $R^3$=H).

Furthermore preferred are aliphatic urea derivatives according to formula (I) in which $R^1$ and $R^2$ have the meaning given above, in particular hydrogen, methyl or ethyl, and $R^3$ is —NHC(O)NR$^1$R$^2$-substituted C1- to C15-cycloalkyl.

Furthermore preferred are liquid hardeners or mixtures including aliphatic urea derivatives of the formula (III)

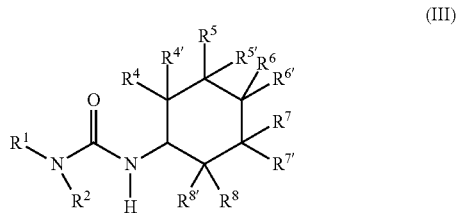

(III)

in which $R^1$, $R^2$, $R^4$, $R^{4'}$, $R^5$, $R^{5'}$, $R^6$, $R^{6'}$, $R^7$, $R^{7'}$ and $R^8$, $R^{8'}$ have meanings given above and in particular are, simultaneously or independently of one another:
$R^1$, $R^2$=simultaneously or independently of one another, hydrogen, C1- to C15-alkyl, C3- to C15-cycloalkyl or together form a ring of C3- to C10-alkylene, $R^4$, $R^{4'}$, $R^5$, $R^{5'}$, $R^6$, $R^{6'}$, $R^7$, $R^{7'}$, $R^8$, $R^{8'}$=simultaneously or independently of one another,
hydrogen,
C1- to C15-alkyl,
C3- to C15-cycloalkyl,
—NHC(O)NR$^1$R$^2$ or
—NHC(O)NR$^1$R$^2$-substituted C1- to C15-alkyl.

Furthermore preferred are liquid hardeners or mixtures including aliphatic urea derivatives of the formula (III) in which $R^1$ and $R^2$ are, simultaneously or independently of one another, hydrogen or methyl and $R^4$, $R^{4'}$, $R^5$, $R^{5'}$, $R^6$, $R^{6'}$, $R^7$, $R^{7'}$, $R^8$, $R^{8'}$ are, simultaneously or independently of one another, hydrogen, methyl, ethyl, —NHC(O)NR$^1$R$^2$ or —NHC(O)NR$^1$R$^2$-substituted methyl or ethyl. Particularly preferred is 1-(N,N-dimethylurea)-3-(N,N-dimethylureamethyl)-3,5,5-trimethylcyclohexane (that is to say $R^1=R^2=R^5=R^{5'}=R^7$=methyl and $R^{7'}$=—CH$_2$—NHC(O)N(CH$_3$)$_2$ and $R^4=R^{4'}=R^6=R^{6'}=R^8=R^{8'}$=hydrogen).

However, it may also be provided for liquid hardeners or mixtures of the present invention to include aromatic urea derivatives of the formula (II). Of these aromatic urea derivatives, particularly preferred are those urea derivatives in which the radicals $R^4$, $R^5$, $R^6$, $R^7$ and $R^8$ are, simultaneously or independently of one another, hydrogen, C1- to C15-alkyl, —NHC(O)NR$^1$R$^2$, —NHC(O)NR$^1$R$^2$-substituted C1- to C15-aryl or —NHC(O)NR$^1$R$^2$-substituted C1- to C15-arylalkyl.

Furthermore preferred are liquid hardeners or mixtures including urea derivatives of the formula (IV)

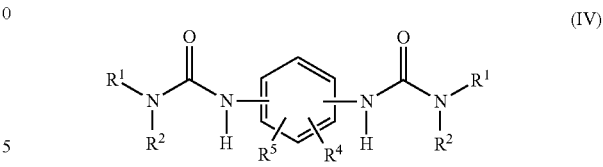

(IV)

in which $R^1$, $R^2$, $R^4$ and $R^5$ have the meanings given above and are in particular, simultaneously or independently of one another, hydrogen or C1-C15-alkyl. Preferably, the radicals $R^1$ and $R^2$ are, in the context of the formula (IV), a methyl radical. Particularly preferred is 1,1-(4-methyl-m-phenylene)-bis-(3,3-dimethylurea) and 1,1'-(2-methyl-m-phenylene)-bis-(3,3-dimethylurea) (that is to say $R^1=R^2=R^5$ is methyl and $R^4$ is hydrogen).

According to a further embodiment, it may in particular be provided for the liquid hardeners according to the invention to include and in particular to comprise a) cyanamide, b) two different urea derivatives of the formula (I), the formula (II) or the formula (I) and the formula (II), and c) at least one stabiliser selected from the group comprising inorganic or organic acids, wherein these hardeners furthermore preferably include and in particular comprise cyanamide and two different urea derivatives of the formula (I), the formula (II) or the formula (I) and the formula (II) in a molar ratio of cyanamide: urea derivative or urea derivative mixture of 1:1 to 4:1.

Particularly preferred are those liquid hardeners which include a urea derivative of the formula (I) or formula (II) wherein the radicals $R^1$, $R^2$ are, simultaneously or independently of one another, methyl or ethyl.

Most particularly suitable are those liquid hardeners which include a urea derivative of the formula (I), wherein the radicals are, simultaneously or independently of one another:
$R^1$, $R^2$=hydrogen, C1- to C15-alkyl;
$R^3$=hydrogen, C1- to C15-alkyl, C3- to C15-cycloalkyl, —NHC(O)NR$^1$R$^2$-substituted C1- to C15-alkyl, —NHC(O)NR$^1$R$^2$-substituted C3- to C15-cycloalkyl or —NHC(O)NR$^1$R$^2$-substituted aryl.

Thus, and in particular, those liquid hardeners are suitable which include a urea derivative of the formula (I) where the radicals are, simultaneously or independently of one another:
$R^1$, $R^2$=simultaneously or independently of one another methyl or ethyl;
$R^3$=hydrogen, C1- to C15-alkyl, C3- to C15-cycloalkyl, —NHC(O)NR$^1$R$^2$-substituted C1- to C15-alkyl, —NHC(O)NR$^1$R$^2$-substituted C3- to C15-cycloalkyl, or —NHC(O)NR$^1$R$^2$-substituted aryl.

According to a further embodiment of the invention, the invention relates to those liquid hardeners which include and in particular comprise a) cyanamide, b) at least one urea derivative selected from the group comprising urea, 1,1-dimethylurea, 3-(3-chloro-4-methylphenyl)-1,1-dimethylurea, 3-(p-chlorophenyl)-1,1-dimethylurea, 3-phenyl-1,1-dimethylurea, 3-(3,4-dichlorophenyl)-1,1-dimethylurea, 1,1'-(methylene-di-p-phenylene)-bis-(3,3-dimethylurea), 3-(3-trifluoromethylphenyl)-1,1-dimethylurea, 1,1'-(2-methyl-m-phenylene)-bis-(3,3-dimethylurea) and/or 1,1'-(4-methyl-m- phenylene)-bis-(3,3-dimethylurea), and c) at least one stabiliser selected from the group comprising inorganic or organic acids, where cyanamide and the urea derivative or urea derivative mixture are furthermore preferably used in a molar ratio of from 1:1 to 4:1.

As stabilisers, as an essential feature of the invention liquid hardeners according to the invention include stabilisers selected from the group comprising inorganic or organic acids. In a preferred embodiment, the present invention relates to a liquid hardener which includes a) cyanamide, b) at least one urea derivative of the formula (I) or the formula (II), and c) at least one stabiliser selected from the group comprising organic carboxylic acids.

Furthermore, the present invention relates to an epoxy resin composition which includes a) an epoxy resin, b) at least one liquid hardener of the type described herein, and c) a stabiliser selected from the group comprising organic carboxylic acids.

As stabilisers, in this context in particular aromatic and non-aromatic carboxylic acids, dicarboxylic acids or tricarboxylic acids have proved particularly suitable. Furthermore preferably, it is possible to use organic acids or aromatic and non-aromatic carboxylic acids, dicarboxylic acids or tricarboxylic acids from the group comprising formic acid, acetic acid, propanoic acid, maleic acid, malonic acid, salicylic acid, lactic acid, citric acid, oxalic acid, adipic acid, benzoic acid, phthalic acid, alkyl sulfonic acids, aryl sulfonic acids, in particular toluene sulfonic acid, or anhydrides thereof.

However, it may also be provided for hardeners according to the invention to include as a stabiliser inorganic acids selected from the group comprising hydrochloric acid, sulfuric acid, sulfurous acid, phosphoric acid, phosphorous acid, ortho-phosphoric acid, diphosphoric acid, triphosphoric acid, polyphosphoric acid, nitric acid or anhydrides thereof.

According to a further advantageous embodiment, the present invention also relates to a liquid hardener for hardening or curing curable polymer resins which includes a) cyanamide, b) at least one urea derivative of the formula (I) or the formula (II), and c) at least one stabiliser selected from the group comprising organic acids, in particular aromatic and non-aromatic carboxylic acids, dicarboxylic acids or tricarboxylic acids, where the hardener includes cyanamide and at least one urea derivative of the formula (I) or the formula (II) in a molar ratio of cyanamide:urea derivative or urea derivative mixture of 1:1 to 4:1.

However, it may also be provided for a liquid hardener for hardening or curing curable polymer resins to include a) cyanamide, b) at least one urea derivative of the formula (I) or the formula (II), and c) at least one stabiliser selected from the group comprising inorganic acids, in particular inorganic acids selected from the group comprising hydrochloric acid, sulfuric acid, sulfurous acid, phosphoric acid, phosphorous acid, ortho-phosphoric acid, diphosphoric acid, triphosphoric acid, polyphosphoric acid, nitric acid or anhydrides thereof, where the hardener includes cyanamide and at least one urea derivative of the formula (I) or the formula (II), preferably in a molar ratio of cyanamide:urea derivative or urea derivative mixture of 1:1 to 4:1.

Particularly preferred are those acids, in particular inorganic acids, which have a water content of less than 20% by weight (in relation to the acid). Most particularly preferred are those acids, in particular inorganic acids, which have a water content of less than 15% by weight, furthermore preferably less than 10% by weight and most particularly preferably less than 5% by weight (in each case in relation to the acid). In this way, it is possible to prepare liquid hardeners which are themselves liquid and in the sense of the present invention are solvent-free.

Surprisingly, it has been found that the stability of the epoxy resin compositions under storage can be improved by adding inorganic or organic acids. Adding stabilisers, in particular those from the group comprising salicylic acid, phthalic acid, toluene sulfonic acid, sulfuric acid, phosphoric acid or anhydrides thereof or mixtures of these allowed the latency to be doubled or in some cases even tripled. At the same time, the outstanding curing properties such as high reactivity at curing temperature by comparison with hardeners with no stabilisers are maintained.

Particularly preferred are those liquid hardeners which comprise a) cyanamide, b) at least one urea derivative of the formula (I) or the formula (II) or mixtures of these, and c) a stabiliser from the group comprising inorganic or organic acids.

In particular those hardeners which include and in particular comprise a) 40 to 70% by weight of cyanamide, b) 30 to 60% by weight of at least one urea derivative of the formula (I) and/or the formula (II) given above, or a selection of these, and c) 0.1 to 10% by weight of stabiliser selected from the group comprising inorganic or organic acids have proved particularly suitable.

Particularly preferred here are those hardeners which include or comprise 45 to 70% by weight, in particular 45 to 60% by weight and most particularly preferably 45 to 55% by weight of cyanamide.

Simultaneously or independently of this, hardeners according to the invention may include or comprise in particular 35 to 60% by weight, in particular 35 to 55% by weight and most particularly preferably 45 to 55% by weight of at least one urea derivative of the formulae (I) and/or the formula (II) given above, or a selection of these.

Simultaneously or independently of this, hardeners according to the invention may include or comprise in particular 0.1 to 8% by weight, in particular 0.1 to 7% by weight and most particularly preferably 0.1 to 5% by weight of stabiliser.

In a further development of the present invention, the present invention also relates to epoxy resin compositions including a) at least one curable epoxy resin and b) at least one liquid hardener of the type described above, and to polyurethane resin compositions including a) at least one curable polyurethane resin and b) at least one liquid hardener of the type described above. In this context, particularly preferred are those epoxy resin compositions which include or comprise a) an epoxy resin, b) at least one liquid hardener of the type described above, and c) a stabiliser selected from the group comprising inorganic acids and/or organic carboxylic acids.

The present invention is not subject to any restrictions in respect of the epoxy resins to be hardened. All commercially available products can be considered which usually have more than one 1,2-epoxide group (oxirane) and may at the same time be saturated or unsaturated, aliphatic, cycloaliphatic, aromatic or heterocyclic. Moreover, the epoxy resins may have substituents such as halogens and phosphorus and hydroxyl groups. Epoxy resins based on glycidyl polyethers of 2,2-bis(4-hydroxyphenyl)-propane (Bisphenol A) and the bromine-substituted derivative (tetrabromobisphenol A), glycidyl polyethers of 2,2-bis(4-hydroxyphenyl)methane (Bisphenol F) and glycidyl polyethers of novolacs and those on the basis of aniline or substituted anilines such as p-aminophenol or 4,4'-diaminodiphenylmethane may be hardened particularly well using the hardeners according to the invention.

The quantity of the liquid hardeners according to the invention to be used is not subject to any restrictions. Preferably, however, to each 100 parts resin 0.01 to 15 parts, preferably 0.1 to 15 parts, preferably 0.1 to 10 parts and most particularly preferably 0.1 to 7 parts is used. A combination of a plurality of liquid hardeners according to the invention or a combination of liquid hardeners according to the invention with further co-hardeners is also within the scope of this invention.

Curing of the epoxy resins with the aid of the hardeners used according to the invention is typically at temperatures from 80° C. The choice of curing temperature depends on the specific requirements of processing and of the product, and may be varied by way of the formulation, primarily by regulating the quantities of hardener and by adding additives. Here, the manner in which energy is supplied to the resin formulations is immaterial. For example, this may be done in the form of heat from an oven or heating elements but equally by means of infrared radiators or excitation using microwaves or other radiation.

By adding further commercially available additives such as are known to those skilled in the art for hardening epoxy resins, the curing profile of the formulations according to the invention can be varied.

Additives for improving the processability of the uncured epoxy resin compositions or for adapting the thermal/mechanical properties of the thermoplastic products to the profile of requirements include, for example, reactive thinners, extenders, thixotropic additives such as thixotropic agents or dispersing agents, defoamers, colorants, pigments, toughening agents, impact resistance improvers or flame-retardant additives.

Epoxy resin formulations using the hardeners according to the invention are suitable both for manual and mechanical processing methods, and in particular for making impregnated reinforcement fibres and composites as described among other places in the writing of G W Ehrenstein, *Faserverbund-Kunststoffe* [Fibre composite plastics], 2006, 2$^{nd}$ edition, Carl Hanser Verlag, Munich, chapter 5, pages 148ff, and M Reyne, *Composite Solutions,* 2006, JEC Publications, chapter 5, pages 51 ff. As well as the use in prepreg methods, handling in infusion and injection methods is in particular a preferred type of processing. In this context, the generally very good miscibility in epoxy resins of the liquid hardeners according to the invention is advantageous, since flowable infusion resins of low viscosity are needed for the impregnation process (cf among others M Reyne, *Composite Solutions,* 2006, JEC Publications, chapter 5, page 65; and G W Ehrenstein, *Faserverbund-Kunststoffe,* 2006, 2$^{nd}$ edition, Carl Hanser Verlag, Munich, chapter 5, page 166).

Thus, the invention also relates to a composite material including a) support material, in particular a fibre material, b) at least one curable polyurethane resin and/or curable polyurethane resin, and c) at least one liquid hardener of the type described above.

Thus, too, the present invention relates to the use of liquid hardeners of the type described above for hardening or curing curable compositions. In particular, this use is aimed at compositions which include at least one curable epoxy resin and/or curable polyurethane resin.

Furthermore, the present invention includes the use of liquid hardeners of the type described above for hardening or curing impregnated fibre materials or impregnated woven fabrics, knitted fabrics or braiding.

Because of the favourable properties of the liquid hardeners according to the invention in use and their low dosage, an advantageous cost/benefit ratio is achieved, as a result of which these hardeners are particularly well suited to technical application.

The examples below illustrate the advantages of the present invention.

EXAMPLES

I. Hardeners According to the Invention

1) Preparation of the Hardeners According to the Invention

Apparatus:

Laboratory agitator (DISPERMAT model AE03-C1), 500 ml metal mixing vessel, agitator plate 60 mm in diameter, metal spatula Method:

100 g of the individual components (as in Table 1) were weighed into a 500 ml mixing vessel and mixed together briefly with the aid of a spatula. The mixture was stirred using the agitator at 100-200 rpm until a thin crystal slurry formed. The mixture was then stirred at 500 to 2000 rpm until a temperature of 40° C. was reached. If necessary, 2 g of stabiliser (organic or inorganic acid) was then added per 100 g of hardener to stabilise the liquid. Stirring of the liquid was then continued at 100 rpm until a temperature of 25° C. was reached. The residue produced was filtered off. The liquid phase thus obtained was collected and was stored at room temperature (23° C.).

Yield:

Depending on mixing, the yield was between 75% and 97%.

Adding the stabilisers according to the invention increased the yield from 75-90% to 83-97%.

TABLE 1

Compositions of the liquid hardeners according to the invention

| Liquid hardeners | Cyanamide Molar fraction | Urea B1 Molar fraction | Urea B2 Molar fraction | Urea B3 Molar fraction | Urea B4 Molar fraction | Stabiliser Molar fraction |
|---|---|---|---|---|---|---|
| H1 | 3 | 1 | 0.16 | — | — | — |
| H2.S2 | 3 | 0.72 | 0.24 | — | — | 0.06 |
| H1.S3 | 3 | 0.72 | 0.24 | — | — | 0.04 |
| H1.S4 | 3 | 1.25 | 0.30 | — | — | 0.11 |
| H1.S5 | 3 | 0.97 | 0.16 | — | — | 0.06 |
| H1.S6 | 3 | 1.01 | 0.21 | — | — | 0.07 |
| H1.S7 | 3 | 1.43 | 0.32 | — | — | 0.07 |
| H1.S8 | 3 | 0.97 | 0.16 | — | — | 0.09 |
| H2 | 2 | 1.0 | — | — | — | — |
| H2.S8 | 2 | 1.0 | — | — | — | 0.05 |
| H3 | 2 | — | — | 1 | — | — |
| H3.33 | 2 | — | — | 1 | — | 0.04 |
| H4 | 2 | — | 0.07 | 1 | — | — |
| H4.S3 | 2 | — | 0.07 | 1 | — | 0.04 |
| H5 | 3 | — | — | — | 0.40 | — |
| H5.S2 | 3 | — | — | — | 0.40 | 0.09 |

Raw Materials Used

Cyanamide: AlzChem AG

Urea B1: 1,1-dimethylurea—AlzChem AG

Urea B2: Technical isomer mixture 1,1'-(4-methyl-m-phenylene)-bis(3,3-dimethylurea) and 1,1'-(2-methyl-m-phenylene)-bis-(3,3-dimethylurea)—AlzChem AG Urea B3: Urea—Merck KGaA Urea B4: 1-(N,N-dimethylurea)-3-(N,N-dimethylureamethyl)-3,5,5-trimethylcyclohexane—CAS: 39992-90-0—AlzChem AG E 828: Epikote 828—Momentive Specialty Chemicals E 828LVEL: Epikote 828 LVEL—Momentive Specialty Chemicals Stabiliser S2: [Phosphoric acid (liquid) 85% according to analysis by Merck]

Stabiliser S3: [Salicylic acid (solid) & phosphoric acid (liquid) ($H_3PO_4$ 85% according to analysis by Merck)] in ratio of 1:1

Stabiliser S4: [Salicylic acid (solid) extremely high purity from Merck]

Stabiliser S5: [Phthalic acid (solid) min. 99.5% from Merck]

Stabiliser S6: [Phthalic acid anhydride (solid) >98% from Merck]

Stabiliser S7: [Toluene-4-sulfonic acid monohydrate (solid) >97% from Merck]

Stabiliser S8: [Sulfuric acid (liquid) >97% from J T Baker]

RIMR 135: Epoxy resin—Momentive Specialty Chemicals

RIMH 137: Liquid amine curing agent—Momentive Specialty Chemicals

Vestamin IPDA: Liquid amine curing agent—Evonik Degussa GmbH

2) Viscosities of the Liquid Hardeners According to the Invention

Determining Viscosity:

Measurement on a HAAKE Rheostress 1 carried out at 25° C. in mPa·s, 35 mm diameter and 1° with shear rate of 5.0/s (per second)

TABLE 2

Viscosity in mPa · s at given temperatures

| Hardener | at 10° C. | at 15° C. | at 20° C. | at 25° C. | at 30° C. |
|---|---|---|---|---|---|
| H1 | 12-14 | 11-13 | 10-12 | 10-11 | 10-11 |
| H1.S2 | 12-14 | 11-13 | 10-12 | 10-11 | 10-11 |
| H1.S3 | 12-14 | 11-13 | 10-12 | 10-11 | 10-11 |
| H1.S4 | 12-14 | 11-13 | 10-12 | 10-11 | 10-11 |
| H1.S5 | 12-14 | 11-13 | 10-12 | 10-11 | 10-11 |
| H1.S6 | 12-14 | 11-13 | 10-12 | 10-11 | 10-11 |
| H1.S7 | 12-14 | 11-13 | 10-12 | 10-11 | 10-11 |
| H1.S8 | 12-14 | 11-13 | 10-12 | 10-11 | 10-11 |
| H2 | 9-11 | 7-9 | 7-9 | 6-8 | 5-7 |
| H2.S8 | 9-11 | 7-9 | 7-9 | 6-8 | 5-7 |
| H3 | — | 5-7 | 5-7 | 5-6 | 4-5 |
| H3.S3 | 7-10 | 5-7 | 5-7 | 5-6 | 4-5 |
| H4 | 8-10 | 8-10 | 7-9 | 6-8 | 5-7 |
| H4.S3 | 8-10 | 8-10 | 7-9 | 6-8 | 5-7 |
| H5 | 13-15 | 12-14 | 11-13 | 10-12 | 10-11 |
| H5.S2 | 13-15 | 12-14 | 11-13 | 10-12 | 10-11 |

Table 2 shows that the viscosities of the mixtures according to the invention are not affected by the acid stabilisation.

3) Melting points of the hardeners according to the invention

Melting points determined by DSC.

Measurement on Mettler Toledo DSC 822

Dyn DSC −40° C.-60° C. at a heating rate of 10K/min

TABLE 3

| | Melting point | |
|---|---|---|
| Hardener | First peak | Second peak |
| H1 | 12-16° C. | — |
| H1.S2 | 11-16° C. | — |
| H1.S3 | 12-17° C. | — |
| H1.S4 | 12-16° C. | — |
| H1.S5 | 12-16° C. | — |
| Hl.S6 | 12-16° C. | — |
| H1.S7 | 12-16° C. | — |
| H1.S8 | 11-16° C. | — |
| H2 | −24-−22° C. | 10-17° C. |
| H2.S8 | 12-19° C. | — |
| H3 | −30-−8° C. | 13-15° C. |
| H3.S3 | 13-16° C. | — |
| H4 | −30-−28° C. | 8-9° C. |
| H433 | 10-15° C. | — |
| H5 | 13-17° C. | — |
| H5.2 | 12-16° C. | — |

The melting points of hardeners H2, H3 and H4 are raised by 30 to 40° C. by the acid stabilisation, in which case the second peaks are absent.

II. Epoxy Resin Composition According to the Invention

1) Preparation of Epoxy Resin Compositions 100 parts by weight of epoxy resin and 7 parts by weight of the hardeners according to the invention were weighed into a 250 ml mixing vessel and mixed using the agitator at 500 rpm for 2 minutes. The mixture was then degassed under vacuum for 10 minutes.

2) Measuring Methods

Dyn. DSC: standard 30-250° C. at a heating rate of 10K/min

Cold Tg: standard 30-250° C., at a heating rate 10K/min

Final Tg: standard Tg

Heat from 30° C. to 200° C. at 20° C./min

Hold for 10.0 min at 200° C.

Cool from 200° C. to 50° C. at 20° C./min

Hold for 5.0 min at 50° C.

Heat from 50° C. to 200° C. at 20° C./min

Hold for 10.0 min at 200° C.

Cool from 200° C. to 50° C. at 20° C./min

Hold for 5.0 min at 50° C.

Heat from 50° C. to 220° C. at 20° C./min

Viscosity at 25° C. in Pa·s (1° cone)

Gelling time at 140° C.

Infusion tests on the heating plate at 80° C.

TABLE 4

Use Tests - Epoxy resin composition with liquid hardener according to the invention (or without stabiliser, not according to the invention) - in each case 100 parts by weight of epoxy resin, 7 parts by weight of liquid hardeners or powder mixture unless otherwise specified

| No. | Epoxy resin composition | Dyn DSC peak [° C.] | Dyn DSC onset [° C.] | Integral heat [J/g] | Gelling time at 140° C. [min:sec] | Glass transition temperature Tg [° C.] | Viscosity at 25° C. in Pa·s |
|---|---|---|---|---|---|---|---|
| E1 | E828:(powder mixture: cyanamide + B1 + B2) (no stabiliser) | 153.3 | 142.0 | 143 | 03:30 | 119 | 5.7 |
| E2 | E828:H1 (no stabiliser) | 147 | 136 | 287 | 03:40 | 123 | 4.0 |
| E2.S2 | E828LVEL:H1.S2 | 153 | 143 | 288 | 04:30 | 123 | 4.8 |
| E2.S3 | E828LVEL:H1.S3 | 153 | 143 | 249 | 04:30 | 124 | 4.1 |

TABLE 4-continued

Use Tests - Epoxy resin composition with liquid hardener according to the invention
(or without stabiliser, not according to the invention) - in each case 100 parts by
weight of epoxy resin, 7 parts by weight of liquid hardeners or powder mixture unless
otherwise specified

| No. | Epoxy resin composition | Dyn DSC peak [° C.] | Dyn DSC onset [° C.] | Integral heat [J/g] | Gelling time at 140° C. [min:sec] | Glass transition temperature Tg [° C.] | Viscosity at 25° C. in Pa·s |
|---|---|---|---|---|---|---|---|
| E2.S4 | E828LVEL:H1.S4 | 150 | 139 | 235 | 04:10 | 126 | 4.5 |
| E2.S5 | E828LVEL:H1.S5 | 150 | 140 | 247 | 04:15 | 123 | 4.7 |
| E2.S6 | E828LVEL:H1.S6 | 150 | 140 | 287 | 04:15 | 124 | 4.6 |
| E2.S7 | E828LVEL:H1.S7 | 150 | 142 | 282 | 04:30 | 126 | 4.2 |
| E2.S8 | E828LVEL:H1.S8 | 149 | 140 | 366 | 04:00 | 124 | 4.1 |
| E3 | E828:(powder mixture: cyanamide + B1) (no stabiliser) | 144.7 | 130.0 | 339 | 04:10 | 122 | 5.5 |
| E4 | E828:H2 (no stabiliser) | 143 | 128 | 380 | 03:15 | 126 | 3.4 |
| E4.S8 | E828LVEL:H2.S8 | 148 | 138 | 422 | 03:45 | 125 | 4.3 |
| E5 | E828:(powder mixture: cyanamide + B3) (no stabiliser) | 171.4 | 158.1 | 150 | 53:00 | 138 | nd |
| E6 | E828:H3 (no stabiliser) | 172 | 156 | 65 | 32:00 | 144 | 3.9 |
| E6.S3 | E828LVEL:H3.S3 | 173 | 163 | 30 | 44:00 | 137 | 4.4 |
| E7 | E828:(powder mixture: cyanamide + B3 + B2) (no stabiliser) | 162.7 | 140.9 | 169 | 10:00 | 130 | nd |
| E8 | E828:H4 (no stabiliser) | 154 | 135 | 310 | 05:30 | 137 | 4.8 |
| E8.S3 | E828LVEL:H4.S3 | 160 | 142 | 283 | 10:00 | 139 | 5.1 |
| E9 | E828:VESTAMIN IPDA 100:23 (no stabiliser) | 115.5 | 79.7 | 453 | 13:30 at 80° C. | 99 | 5.3 |
| E10 | RIMR135:RIMH137 100:30 (no stabiliser) | 125.9 | 87.9 | 436.0 | 40:00 at 80° C. | 98 | 4.1 |
| E11 | E828:H5 | 139.0 | 147.3 | 296 | 04:50 | 131 | 5.5 |
| E11.S2 | E828:H5.S2 | 145.9 | 152.8 | 380 | 05:30 | 130 | 5.8 | nd = not determinable, since when the powders are added individually agglomerations are formed which prevent a precise measurement of the viscosity within the epoxy resin The advantages of the liquid hardeners according to the invention when hardening epoxy resins by comparison with the individual addition of the comparable hardeners and accelerators as powder components can be seen from Table 4.

With the liquid mixtures according to the invention, by comparison with the powder mixtures of the same compositions hardening consistently begins at lower temperatures and the times before polymerisation begins (gelling time at 140° C.) are shorter. The mixtures according to the invention lower the viscosity of the epoxy resins significantly, by up to approximately 50%, which makes them suitable for use as hardeners for infusion resin systems, and increases their glass transition temperatures. The integral heat values (J/g), which are consistently higher, indicate a more spontaneous reaction of the mixtures according to the invention by comparison with the individual powder components used as hardeners and accelerators. Moreover, only half or a third of the quantity of hardener is required (by comparison with known liquid amine hardeners). This enables a considerable cost advantage to be realised.

By comparison with this, although the known and usual liquid amine hardeners such as RIMH 137 (from Momentive) or IPDA (from Evonik) display lower curing temperatures, the mixtures according to the invention begin polymerisation at comparable times and achieve much higher glass transition temperatures.

Furthermore, the summary table shows that the reactivity values of the hardeners according to the invention are changed only slightly by being stabilised with acids, by comparison with the underlying mixtures. The reactivity values are somewhat smaller as a result of the acid stabilisation. The glass transition temperatures and viscosities also remain in the same order of magnitude.

TABLE 5

Latencies of the epoxy resin compositions according to Table 4 in days (d) - at 23° C. in an environmental chamber (viscosity measured at 25° C.)

| No. | Start | 1 d | 4 d | 5 d | 6 d | 7 d | 8 d | 10 d | 12 d | 16 d | 18 d | 20 d | 25 d | 30 d | 35 d | 40 d | Result |
|---|---|---|---|---|---|---|---|---|---|---|---|---|---|---|---|---|---|
| E1 | 5.7 | 4.8 | 7.2 | 10 | 21 | 102 | >500 | solid | — | — | — | — | — | — | — | — | |
| E2 | 4.0 | 4.2 | 10.1 | 17.9 | 40.1 | — | — | — | — | — | — | — | — | — | — | — | 4 days |
| E2.S2 | 4.8 | 4.8 | 4.9 | 4.9 | 4.9 | 5.0 | 5.1 | 5.2 | 5.3 | 6.9 | 12.7 | 25.1 | — | — | — | — | 16-17 days |
| E2.S3 | 4.1 | 4.1 | 4.1 | 4.2 | 4.3 | 4.6 | 4.8 | 5.5 | 6.7 | 11.9 | 62.8 | — | — | — | — | — | 14-15 days |
| E2.S4 | 4.5 | 4.5 | 4.6 | 4.8 | 4.9 | 7.9 | 13.9 | 55.3 | — | — | — | — | — | — | — | — | 7-8 days |
| E2.S5 | 4.7 | 4.7 | 4.8 | 4.9 | 5.7 | 6.6 | 11.0 | 32.3 | — | — | — | — | — | — | — | — | 7-8 days |
| E2.S6 | 4.6 | 4.6 | 4.7 | 4.9 | 5.3 | 6.5 | 11.5 | 42.3 | — | — | — | — | — | — | — | — | 7-8 days |
| E2.S7 | 4.2 | 4.3 | 4.5 | 5.0 | 6.0 | 7.0 | 11.0 | 38.1 | — | — | — | — | — | — | — | — | 7-8 days |
| E2.S8 | 4.1 | 4.3 | 4.6 | 5.2 | 5.4 | 5.7 | 9.7 | 21.3 | — | — | — | — | — | — | — | — | 7-8 days |
| E3 | 5.5 | 5.6 | 14 | 14 | 14 | 21 | solid | — | — | — | — | — | — | — | — | — | 2 days |
| E4 | 3.4 | 3.9 | 9.5 | 53.0 | — | — | — | — | — | — | — | — | — | — | — | — | 3 days |
| E4.S8 | 4.3 | 4.3 | 4.3 | 4.3 | 4.3 | 4.5 | 4.7 | 4.9 | 11.9 | 133 | — | — | — | — | — | — | 10-11 days |
| E5 | nd | nd | nd | nd | nd | nd | nd | nd | nd | solid | — | — | — | — | — | — | |

TABLE 5-continued

Latencies of the epoxy resin compositions according to Table 4 in days (d) - at 23° C. in an environmental chamber (viscosity measured at 25° C.)

| No. | Start | 1 d | 4 d | 5 d | 6 d | 7 d | 8 d | 10 d | 12 d | 16 d | 18 d | 20 d | 25 d | 30 d | 35 d | 40 d | Result |
|---|---|---|---|---|---|---|---|---|---|---|---|---|---|---|---|---|---|
| E6 | 3.9 | 3.9 | 4.2 | 4.4 | 5.6 | 8.1 | 13.0 | 13.0 | — | — | — | — | — | — | — | — | 7 days |
| E6.S3 | 4.4 | 4.4 | 4.4 | 4.4 | 4.4 | 4.4 | 4.4 | 4.4 | 4.4 | 4.4 | 4.4 | 4.5 | 4.5 | 4.6 | 6.8 | 38.4 | 35 days |
| E7 | nd | nd | nd | nd | nd | nd | nd | nd | nd | solid | — | — | — | — | — | — | nd |
| E8 | 4.8 | 4.8 | 5.2 | 6.7 | 13.9 | 47.6 | — | — | — | — | — | — | — | — | — | — | 5 days |
| E8.S3 | 5.1 | 5.1 | 5.1 | 5.1 | 5.1 | 5.1 | 5.1 | 5.1 | 5.2 | 5.3 | 5.5 | 5.7 | 5.9 | 13.1 | 33.0 | — | 30 days |
| E9 | 5.3 | solid | — | — | — | — | — | — | — | — | — | — | — | — | — | — | >1 day |
| E10 | 4.1 | solid | — | — | — | — | — | — | — | — | — | — | — | — | — | — | >1 day |
| E11 | 5.5 | 5.5 | 5.5 | 5.5 | 5.5 | 5.5 | 5.6 | 5.7 | 6.7 | 8.0 | 12.9 | 37.6 | — | — | — | — | 17 days |
| E11.S2 | 5.8 | 5.8 | 5.8 | 5.8 | 5.8 | 5.8 | 5.8 | 5.8 | 5.8 | 5.8 | 5.9 | 6.0 | 6.1 | 6.4 | 7.8 | 10.1 | 40 days | nd = not determinable, since when the powders are added individually agglomerations are formed which prevent a precise measurement of the viscosity within the epoxy resin The storage capacities=latencies of hardener/accelerator systems in the epoxy resin are affected to a considerable extent by the solubility of these systems in the resin. The fact that powder hardener/accelerator systems are relatively insoluble in epoxy resin at temperatures <60° C. enables long storage times of these mixtures with no reaction between the components.

It can be anticipated that mixtures of liquid hardener/accelerator in epoxy resin will result in rapid reaction between the components, giving drastically restricted storage capacities=latencies. This is shown by the amine hardeners listed in Table 5 (RIMH 137 from Momentive and Vestamin IPDA from Evonik).

Surprisingly, however, the liquid hardeners according to the invention do not show fast reaction with epoxy resins at room temperature, so their storage capacities=latencies in epoxy resins is significantly longer than those of conventional liquid amine hardener systems.

In Table 5, the full effect of the hardeners according to the invention with acid stabilisation is seen by comparison with their underlying mixtures. The latencies of the stabilised mixtures are drastically lengthened, which substantially increases the safety in use of epoxy resin formulations when they are used as one-component infusion or injection resin formulations.

Petri Dish Test:

30 g of a mixture of E828LVEL and a liquid hardener in a ratio of 100:7.0 were weighed into a Petri dish with a diameter of 10 cm (pre-treated with XTEND Release 19CMS as a release agent), which was closed with a lid. The Petri dish was put into a drying cabinet at 80° C. and taken out again once the mixture had solidified. After cooling, the resulting plate was removed and part of the plate was used for a cold Tg and final Tg test.

TABLE 6

Cold Tg and final Tg test of epoxy resin compositions according to the inventionas in Table 4

| No. | Epoxy resin composition | Cold Tg [° C.] | Residual heat [J/g] | Final Tg [° C.] |
|---|---|---|---|---|
| E2 | E828LVEL:H1 | 82.0 | 54 | 132 |
| E2.S8 | E828LVEL:H1.S8 | 71.5 | 103 | 131 |
| E2.S3 | E828LVEL:H1.S3 | 69.1 | 131 | 129 |
| E4.S1 | E828LVEL:H4 | 89.9 | 82 | 132 |
| E4.S8 | E828LVEL:H4.S8 | 63.0 | 158 | 126 |
| E11.S2 | E828LVEL:H5.S1 | 97.2 | 72 | 139 |

During curing of the composition, the mixtures according to the invention behave like their unstabilised starting mixtures Method of Trial Infusion:

Epoxy resin compositions according to Table 4 were mixed and preheated in a heatable storage vessel. The inlet line was introduced into the storage vessel and fixed, the outlet line (see structure of an infusion test, Table 7) was connected to the vacuum pump by way of a safety valve, and the pump was switched on. The heating plate (which simulates the heatable mould) was brought to the infusion temperature. On application of the vacuum, the epoxy resin composition was drawn through the fibre composite. Once impregnation was complete, the inlet and outlet lines were clamped off and capped and the entire structure was then cured on the heating plate, forming a laminate. After curing and cooling were complete, the laminate was removed from the structure.

TABLE 7

Fibre composite-structure for infusion tests

| Component part | Material |
|---|---|
| Base layer | R&G vacuum film No. 390160 |
| Seal | Tacky Tape SM5126-½" × X⅛" |
| Separating film (bottom) | Nylon Peel ply (plain weave 64 g/m³) shifted |
| Laminate (glass fibre) | 3-layer Atlas FK 144 (296 g/m³) |
| Separating film (top) | Nylon Peel ply (plain weave 64 g/m³) shifted |
| Release film | R&G release film No. 390190 |
| Aerating film | R&G non-woven No. 390180 |
| Vacuum mesh | Degassing mesh 150 g/m³ (running direction-black) |
| Vacuum film | R&G vacuum film No. 390160 |
| Lines (inlet and outlet) | PVC, clear (3.0 mm internal dia, 5.0 mm external dia) |
| Support | Glass plate |

Mould: heating plate
Storage container: glass beaker
Vacuum: Vacuum pump, standard (<20 mbar)

TABLE 8

Infusion test with epoxy resin compositions as in Table 4-resin:hardener ratio of 100:7.0 (comparisons)

| Epoxy resin composition | Curing time Injection in h time in minutes | Temperature in ° C. | Cold Tg | Final Tg | Remarks |
|---|---|---|---|---|---|
| E2 | 5 | 1 h 59-63° C. | 72 | 128 | Fibre composite readily removable from core |

TABLE 8-continued

Infusion test with epoxy resin compositions as in Table 4-resin:hardener ratio of 100:7.0 (comparisons)

| Epoxy resin composition | Injection time in minutes | Curing time Temperature in ° C. | Cold Tg | Final Tg | Remarks |
|---|---|---|---|---|---|
| | | 5 h 69-74° C. | | | Fibre composite looks good, is even and has no voids |
| E2.S3 | 4 | 4.25 h 80° C. | 107 | 134 | Fibre composite readily removable from core Fibre composite looks good, is even and has no voids |
| E4 | 12 | 20 h 70° C. | 79 | 137 | Fibre composite readily removable from core Fibre composite looks good, is even and has no voids |
| E6 | 45 | 6 h 80° C. | 56 | 134 | Fibre composite readily removable from core Fibre composite looks good, is even and has no voids |
| E8 | 45 | 5.5 h 75-78° C. | 97 | 140 | Fibre composite readily removable from core Fibre composite looks good, is even and has no voids |
| E9 | 20 | 6 h 70° C. | 93 | 99 | Fibre composite readily removable from core Fibre composite looks good, is even and has no voids |
| E10 | 18 | 6.5 h 40° C. and then 16 h 80° C. | 68 | 93 | Fibre composite readily removable from core Fibre composite looks good, is even and has no voids |

The powder hardener/accelerator systems of the individual components are unsuitable for polymerising the epoxy resins by the infusion method. When mixed with epoxy resin, the mixtures thereof are filtered out (separated) by the fine-mesh fabrics at the suction inlet points, and are no longer available for hardening the epoxy resins. Thus, the epoxy resin compositions E1, E3, E5 and E7 are not suitable for preparing composites by means of the infusion method.

However, Table 8 shows that, like the known two-component amine systems (RIMH 137 from Momentive, IPDA from Evonik), the epoxy resin compositions according to the invention E2, E4, E6 and E8, which contain the liquid hardeners H1, H2, H3 and H4 according to the invention, enable impregnation of the fabric fibres by the infusion method and in comparable time periods. In this connection, however, they typically need shorter curing periods at 80° C. and achieve significantly higher glass transition temperatures.

Furthermore, by comparison with the two-component amine systems (RIMH 137 from Momentive, IPDA from Evonik), a significantly smaller quantity of hardener is needed.

The superiority of the novel liquid hardeners is also shown by the fact that a higher glass transition temperature (final Tg) is achieved in the composite.

In the infusion method, too, all the hardeners according to the invention can be used like their unstabilised starting mixtures.

The invention claimed is:

1. A liquid hardener for curing curable polymer resins, comprising:
   a) cyanamide;
   b) at least one urea derivative of the formula (III) or formula (IV)

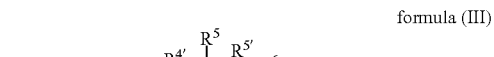

formula (III)

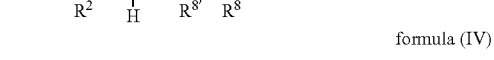

formula (IV)

wherein the following applies to the radicals, in each case simultaneously or independently of one another:
   $R^1$, $R^2$=simultaneously or independently of one another hydrogen, C1- to C15-alkyl, C3- to C15-cycloalkyl or together form C3- to C10-alkylene;
   $R^4$, $R^{4'}$, $R^5$, $R^{5'}$, $R^6$, $R^{6'}$, $R^7$, $R^{7'}$, $R^8$, $R^{8'}$=simultaneously or independently of one another hydrogen, halogen, C1- to C15-alkyl, C3- to C15-cycloalkyl, aryl, arylalkyl, —$CF_3$, —NHC(O)N$R'R^2$,
   —NHC(O)N$R^1R^2$-substituted C1- to C15-alkyl,
   —NHC(O)N$R^1R^2$-substituted aryl or
   —NHC(O)N$R^1R^2$-substituted arylalkyl; and,
   c) at least one stabiliser comprising inorganic or organic acids,
wherein the hardener includes cyanamide and at least one urea derivative of the formula (III) or formula (IV) in a molar ratio of cyanamide: the at least one urea derivative of 1:1 to 4:1.

2. The liquid hardener of claim 1, wherein the hardener, besides cyanamide, the at least one urea derivative and the stabiliser, includes no solvents or solubilisers or is free of the solvents or the solubilisers.

3. The liquid hardener of claim 1, wherein the inorganic or the organic acid is an acid selected from the group consisting of salicylic acid, phthalic acid, toluene sulfonic acid, sulfuric acid, phosphoric acid, anhydrides thereof and mixtures thereof.

4. An epoxy resin composition comprising at least one curable epoxy resin and at least one of the liquid hardeners of claim 1.

5. A polyurethane resin composition comprising at least one curable polyurethane resin and at least one of the liquid hardeners of claim 1.

6. A composite material comprising a support material, at least one curable epoxy resin or curable polyurethane resin and at least one of the liquid hardeners of claim 1.

7. The liquid hardener of claim 1, wherein the polymer resins are epoxy resins.

8. The composite material of claim 6, wherein the support material is a fibre material.

9. The liquid hardener of claim 1, wherein the liquid hardener has a melting point $S_m$ of <20° C. at normal pressure.

10. The liquid hardener of claim 1, wherein the hardener is liquid at a temperature of 20° C. at normal pressure and has a viscosity less than 1 Pa·s.

11. The liquid hardener of claim 1, wherein the hardener includes at least two different urea derivatives of the at least one urea derivative.

12. A method for curing compositions comprising at least one curable epoxy resin or curable polyurethane resin, comprising employing the liquid hardener of claim 1.

13. A method for curing impregnated fibre materials or impregnated woven fabrics, knitted fabrics or braiding, comprising employing the liquid hardener of claim 1.

* * * * *